United States Patent [19]
Baum et al.

[11] Patent Number: 4,739,471
[45] Date of Patent: Apr. 19, 1988

[54] METHOD AND MEANS FOR MOVING BYTES IN A REDUCED INSTRUCTION SET COMPUTER

[75] Inventors: Allen J. Baum, Palo Alto; William R. Bryg, Saratoga, both of Calif.

[73] Assignee: Hewlett-Packard Company, Palo Alto, Calif.

[21] Appl. No.: 750,701

[22] Filed: Jun. 28, 1985

[51] Int. Cl.⁴ .................................................. G06F 9/00
[52] U.S. Cl. .................................................. 364/200
[58] Field of Search ... 364/200 MS File, 900 MS File

[56] References Cited

U.S. PATENT DOCUMENTS 4,569,016  2/1986  Hao et al. .......................... 364/200

OTHER PUBLICATIONS

Intel, "User's Manual", 10/79, pp. 5-4.
Radin, "The 801 Minicomputer", 3/82, ACM, pp. 39 & 44.
Patterson et al, "RISC", 5/81, IEEE, pp. 443, 445, 448 and 453.

Primary Examiner—Gary V. Harkcom
Assistant Examiner—C. H. Lynt
Attorney, Agent, or Firm—Edward Y. Wong

[57] ABSTRACT

A basic instruction for moving a string of bytes in a word has been devised. Because the operations in the instruction are basic, very few variations are necessary to accommodate diversity of lengths and variables. These operations are imbedded in a single code sequence; the compiler can therefore generate exactly the minimum sequence necessary to perform the operations and can precompute many of the operands at compile time, typically completing the instruction within a single cycle time. The control necessary to optimize the operations is then in the compiler instead of the hardware.

11 Claims, 2 Drawing Sheets

METHOD AND MEANS FOR MOVING BYTES IN A REDUCED INSTRUCTION SET COMPUTER

BACKGROUND AND SUMMARY OF THE INVENTION

In a prior art computer with microprogramming, the control section or such a computer generally is provided with an autonomous read-only storage. Each time a program instruction begins, the control unit generates an address to its read-only storage derived from the function or operation code of the instruction. This address locates what may be the first of a series of words which supply the control signals to the computer for carrying out the particular instruction being processed. Each instruction in effect generates a transfer to a microsubroutine associated with it, and the resultant step-by-step operation of the machine corresponds to the execution of a program on a very detailed level.

In such a computer in the prior art, program instructions generally comprise an operation code, i.e., the opcode, together with information relative to the location of the operands, that is, the data to be operated on. These operands sometimes may also have additional operational information. The length of the program instructions may be relatively long or relatively short depending on the quantity of data involved. The operating codes generally indicate the operation to be performed. Once the length of the operating code is established, it is possible to have only a certain fixed set of different operating codes and related program instructions. However, not all the operating codes which may theoretically be expressed with a certain number of bits, i.e., operating codes within the fixed set, are used to characterize program instructions for which the computer is provided with microprogramming resources. Generally, only a part or subset is used, and thus programming efficiency is degraded.

Also in a prior art computer, the memory of the computer provides the largest hardware cost. Therefore, the key to hardware speed and minimum size lies in efficient use of the memory. Fixed instruction length computers require the same number of bits for each instruction word regardless of the simplicity or complexity of the operation to be executed. As an example, many bits can be wasted in instructions which specify simple operations, while many instructions can be wasted in complex operations where an instruction's capability is limited by its length. Therefore, it is desired to design a computer with an instruction set which can perform all applications most efficiently.

To increase the efficiency of microprogramming in the prior art, the concept of optimizing compilers is used and implemented (1) to compile programming languages down to instructions that are as unencumbered as microinstructions in a large virtual address space and (2) to make the instruction cycle time as fast as the technology would allow. Computers having such optimized compilers are designed to have fewer instructions than those in the prior art, and what few instructions they do have are simple and would generally execute in one cycle. Such computers have been aptly named reduced instruction set computers (RISCs). Instructions that are part of a reduced instruction set in a RISC machine and that provide increased efficiency in a novel way have been invented and are described herein.

Specifically, one of the most common operations performed on a computer is moving a string of bytes, or words, from one address to another in memory. Because of the frequency of this operation, it is important to make it efficient. But because of the diversity in the exact form of the operation, diversity of fixed or variable lengths and addresses and diversity of lengths and alignments, it is difficult to find a uniform mechanism to perfom this operation efficiently, even though in practice very few of the variations may be used with any frequency.

In the prior art, one approach has been to specify one or two instructions that move bytes from a source to a destination. The options available, however, are very limited; so are the specifications of operands. Because of the number of options that has to be specified, i.e., addresses and lengths, the instructions in the set are very large. These instructions require several cycles to execute and assorted microcodes to control. Because of the long execution times, problems of these operations being locked out because of input/output (I/O) interruptions occur frequently. Therefore, these operations further need to be interruptable and/or restartable. This need obviously adds to the complexity of the instructions.

Furthermore, a similar problem occurs in a virtual memory system because of the long execution times. There, the problem of page faults occur instead of those of interrupts. The control necessary to solve these problems add cost and complexity to the hardware.

In short, additional complexity in data paths and controls for optimizing the execution of such operations, even if only to optimize operations of the most frequently occurring variations, is unavoidably introduced. Alternatively, a nonhardware support approach can be used to solve these problems. In such a situation, however, the operations would result in unacceptably long execution times.

In accordance with the preferred embodiment of the invention, a basic instruction for moving a string of bytes has been devised to solve these problems. Because the operations in the instruction are basic, very few variations are necessary to accommodate diversity of lengths and variables. Instruction for these operations are imbedded in a code sequence; the compiler can therefore generate exactly the minimum sequence necessary to perform the operations and can precompute many of the operands at compile time. The control necessary to optimize the operations is then in the compiler instead of the hardware, thereby avoiding the above-enumerated disadvantage of a hardware approach solution. As a consequence of all these factors, the instruction is implemented as a single-cycle operation. In other words, another instruction can be initiated within one cycle of the previous instruction without any impediment or "lockout."

DETAILED DESCRIPTION OF THE INVENTION

The operation of the instruction in accordance with the preferred embodiment of the invention is generated by a code sequence. Hence no special control is needed to handle I/O interrupts or page faults. The byte-move basic instruction requires very little hardware over and above that already necessary for other operations; it therefore will execute as fast or faster than hardware-assisted instructions for most frequent operations.

The basic instruction is a store operation that stores corresponding bytes from a source register into memory, either storing the portion of the word starting at the instruction-specified byte address to the end of the word, or storing the portion of the word from the start to the specified byte address. All of the normal indexed store options, such as cache control, instruction modification, and the like, are available with the operation. The instruction handles the beginning and ending cases for byte moves, but does require an extra alignment instruction for each word moved in cases of unaligned moves. The operation of the store instruction follows.

If "begin" is specified by having a modifier ", B" correspond to an operation identifier field a=0 in the instruction, the low-order bytes of the contents of a general register "t" are stored into memory starting at the byte whose address is given by an effective address contained in the instruction.

If "end" is specified by having a modifier ", E" correspond to the operation identifier field a=1 in the instruction, the high-order bytes of the contents of the general register "t" are stored into memory starting at the high-order byte in the word specified by the effective address. This process continues until the byte specified by the effective address is reached though not included. When the effective address specifies the high-order byte in a word, nothing is stored, but protection is still checked.

If "address modification" is specified, a general register "b" is updated to a word address.

As an example of a byte-move basic instruction set in accordance with the invention, the instruction STORE BYTES (STBYS) 140 is described.

Figure 1:
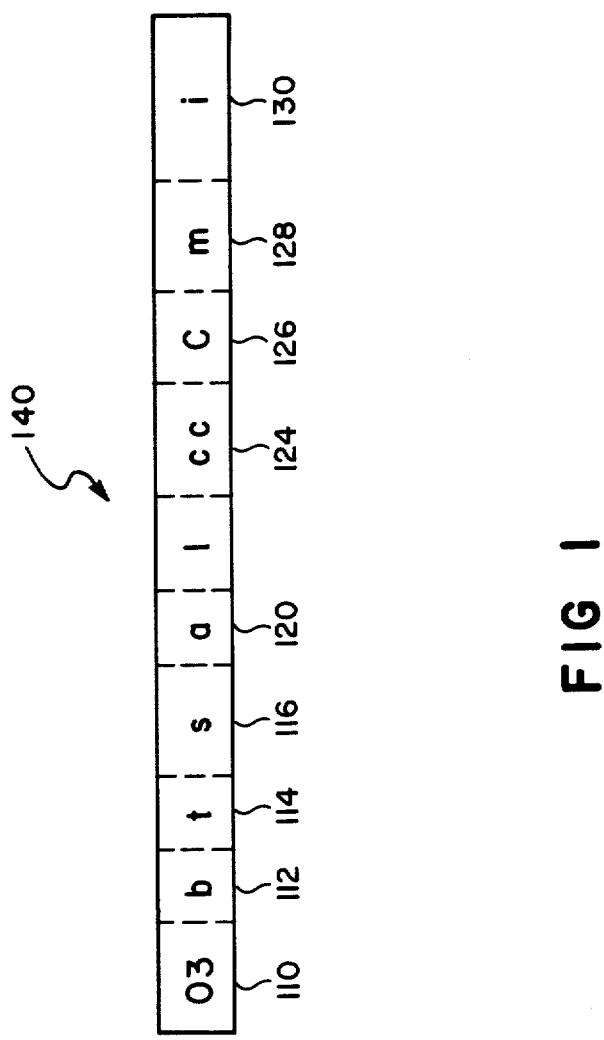
FIG. 1 shows the format of an instruction exemplifying an embodiment of the invention.

The instruction STBYS 140 is denoted as follows: STBYS,ma,cc 7,i(s,b)
and has the format illustrated in FIG. 1, viz.,
03/b/t/s/a/1/cc/C/m/i,
where:
03 is a 6-bit operation code 110 specifying the instruction class "Index Mem" which, together with the operation code extension "C" 126, indicates the instruction STBYS 140;
b is a 5-bit field 112 identifying an address register;
t is a 5-bit field 114 identifying a data register;
s is a 2-bit specifier 116 for a space register (SR);
a is a 1-bit specifier 120 for modify before or after;
cc are two cache control bits 124;
C is a 4-bit opcode extension 126;
m is a 1-bit specifier 128 for indicating address modification or not; and
i is a 5-bit signed immediate field 130.

The instruction STBYS 140 is implemented as follows:

1. A temporary 48-bit quantity "addr" is calculated as follows:
    a. calculate an "immediate" by removing the low-order bit of "i" 130 and extending the remainder on the left with sign bits to a 32-bit quantity, taking the removed bit as the sign bit; then if address modification and post-modify are specified, that is, if the modification bit 128 m=1 and the before or after specifier bit 120 a=0, assign "0" to "ind"; otherwise, assign the quantity "immediate" to "ind";
    b. next, add "ind" to the contents of address register "b" and assign this quantity to "offset";
    c. if the space register specifier 116 s=0, then assign the contents of the space register whose address is the sum of 4 and the contents of bits 0 and 1 of address register "b" to "space"; otherwise, assign the contents of space register "s" to "space"; and
    d. assign the concatenation of the contents of "space" and "offset" to "addr".

2. During the first cycle, T:
    a. assign the product of 8 and modulo 4 of "addr" to "pos";
    b. if the modification bit 128 m=1, then assign the quantity comprising the sum of the contents of register "b" and "immediate" logically ANDed to X'FFFFFFFC to space register "b", where X' is the hexidecimal representation of a 32-bit word;
    c. also, when virtual memory translation is on, that is, when the processor status word (PSW) D-bit=1, and if the before or after modification specifier bit 120 a=1, then execute a memory store by assigning the data contained in bits 0 to "pos"-1 of register "t" to bits 0 to "pos"-1 of memory "addr"; and if a=0, then execute a memory store by assigning the data contained in bits "pos" to 31 of register "t" to bits "pos" to 31 of memory "addr"; and
    d. when virtual memory translation is disabled, that is, when the PSW D-bit=0, and if a=1, then execute a memory store by assigning the data contained in bits 0 to "pos"−1 of register "t" to bits 0 to "pos"−1 of physical memory having an address comprising bits 16 to 47 of "addr"; and if a=0, then execute a memory store by assigning the data contained in bits "pos" to 31 of register "t" to bits "pos" to 31 of physical memory having an address comprising bits 16 to 47 of "addr".

Figure 2:
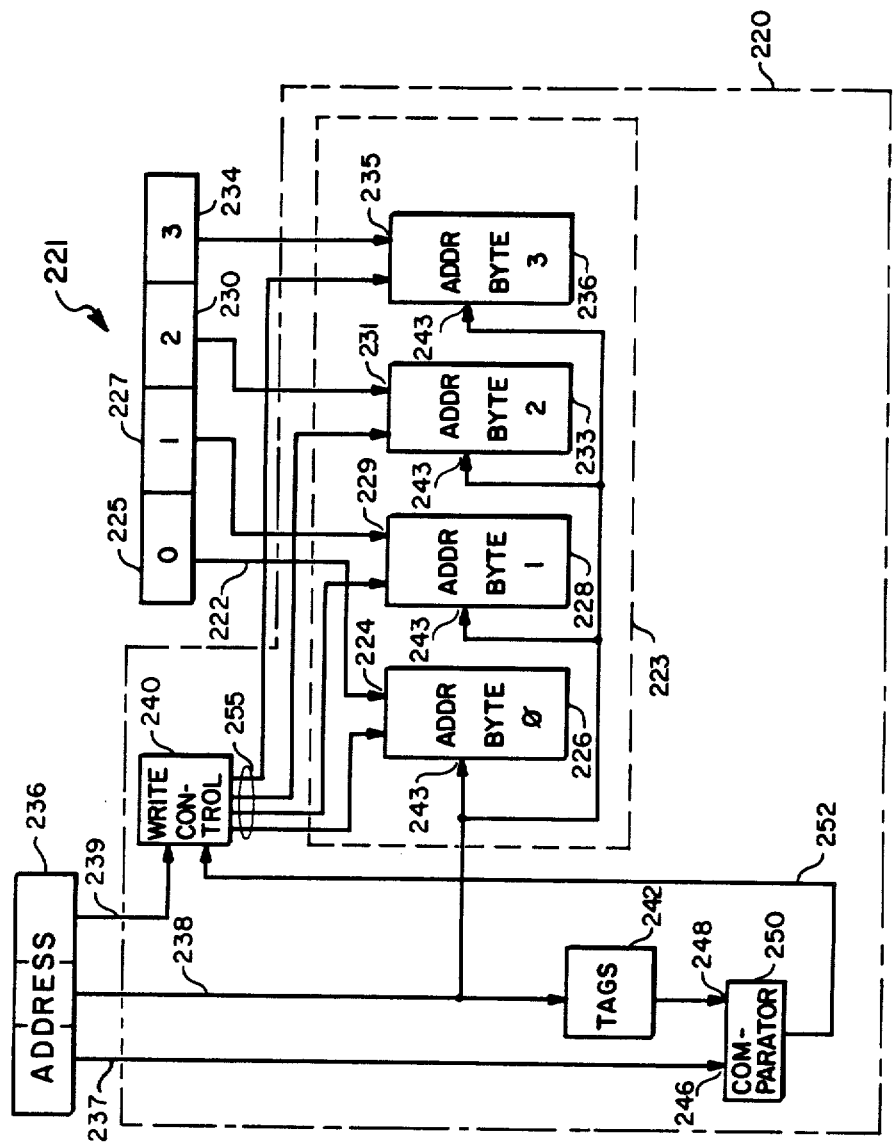
FIG. 2 shows an apparatus for implementing the instruction in accordance with the invention.
Figure 2:
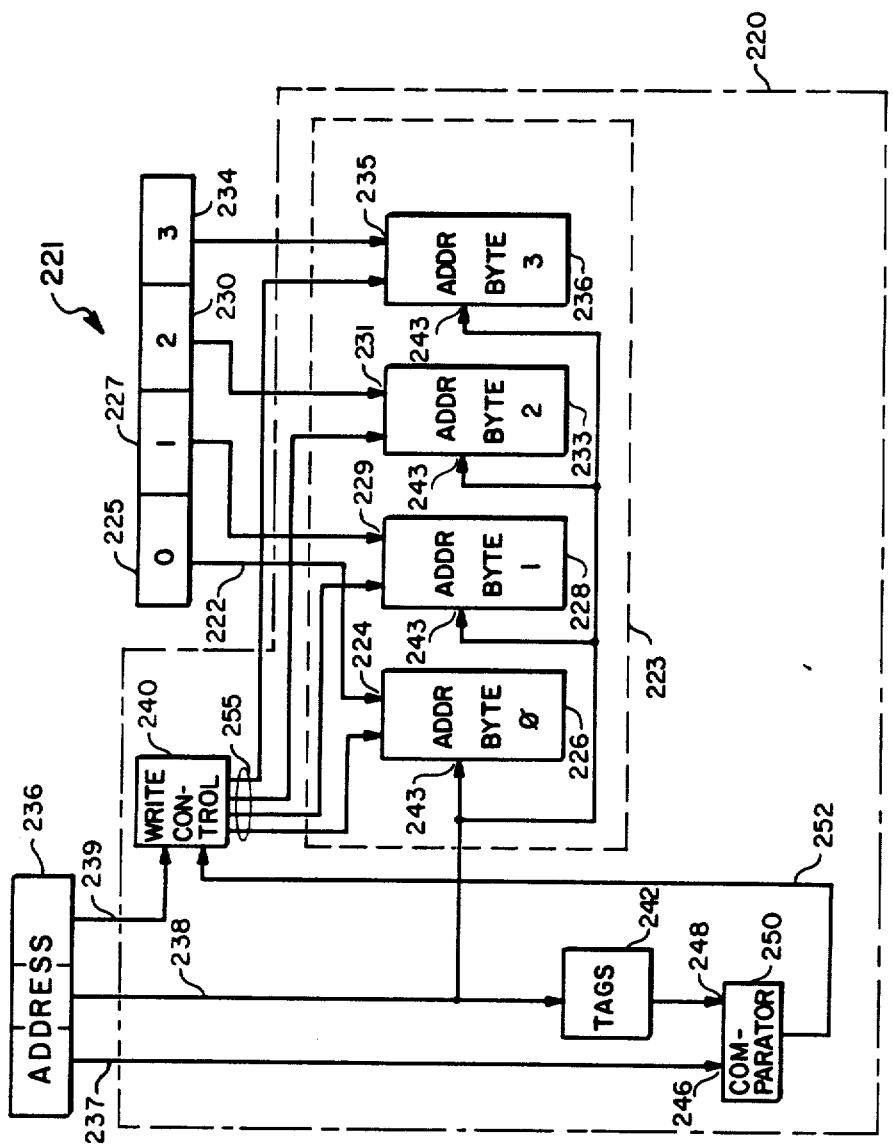
Figure 2:
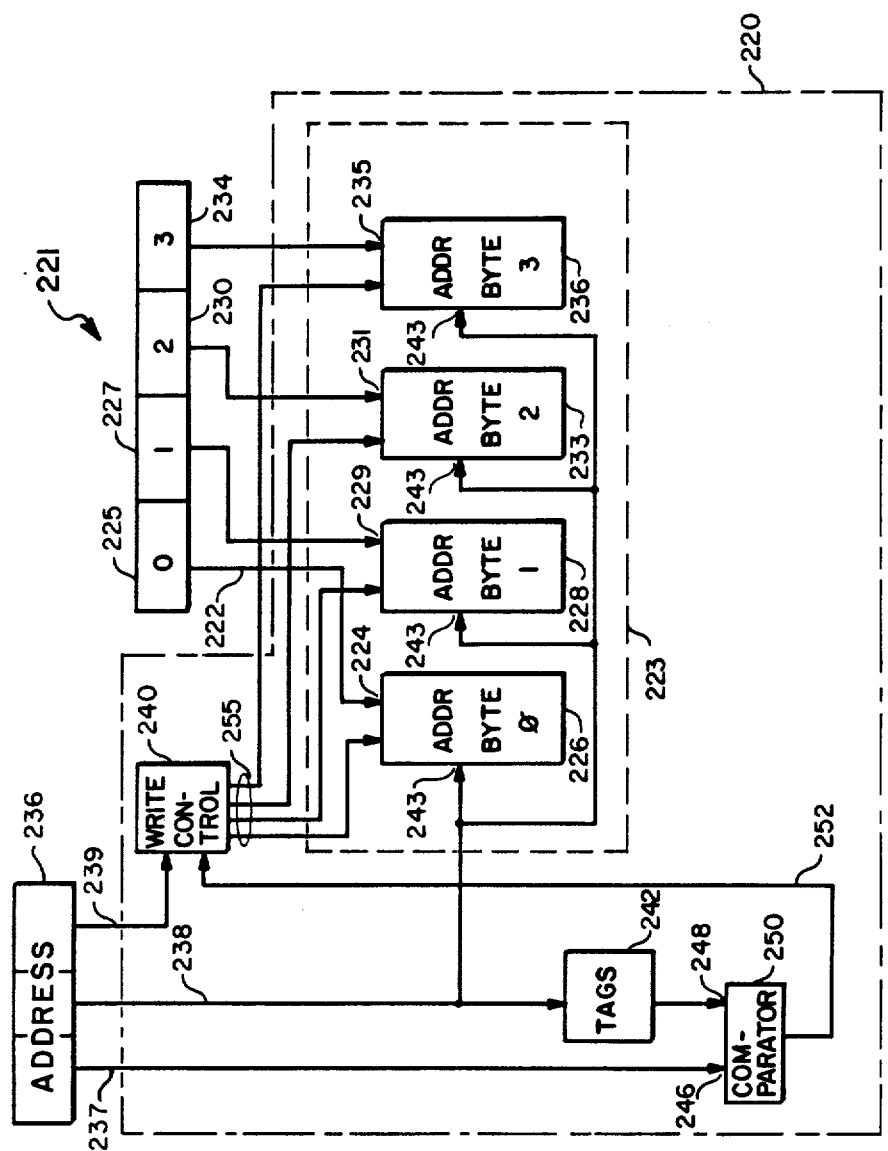

FIG. 2 shows a cache memory as part of a system in a computer device for implementing the instruction for moving bytes in accordance with the invention. But before proceeding, it should be understood what a cache memory is.

A cache is basically a high-speed buffer that stores a limited amount of the information that is in the main memory. The cache memory typically is in an area close to the processing unit of the computer device where it can be accessed quickly. It is much smaller than the main memory and as such has only a very small portion of the data involved in the computer device. Every time that the processing unit issues an instruction to the main memory, the cache is checked to see whether the data being referenced is actually there in the cache. It does this by comparing a portion of the address called a "tag" with the "tag" portion that is in the cache. If the two match, the data is actually present in the cache, and that constitutes a "cache hit". If the "tag" in the address does not compare with the "tag" that is in the cache, the data being referenced is not in the cache, and the reference must be accessed from the main memory. This situation contitutes a "cache miss".

In FIG. 2, data from a data register 221 goes to the byte inputs 223 of a cache 220. Specifically, byte "0" 225 of the data register 221 goes to the data input port 224 of byte "0" 226 of the cache 220. Similarly, byte "1" 227 of the data register 221 goes to the data input port 229 of byte "1" 228. Likewise, byte "2" 230 goes to the input port 231 of byte "2" 233 of the cache 220; and byte "3" 234 goes to the input port 235 of byte "3" 236 of the cache 220. The address 236 that is generated within the instruction is divided up by the cache 220 into several parts 237-239. The portion 239 that accesses the byte within the word is directed to a write control unit 240. The next higher portion 238 of the address 236 towards a more significant end of the address 236 is an index for accessing the tags out of the tag portion 242 of the cache 220. This index portion 238 is also used to specify an address 243 to each of the bytes 226, 228, 233, 236 to result in a byte that will be the one written if there is a write enable pulse. The highest portion 237 of the address 236 is the tag 246 from the address 236 which is compared with the tag 248 that comes out of the tag portion 242 of the cache 220. If the comparison at a comparator means 250 within the cache 220 shows the two tags 246, 248 to be equal, there is a cache hit. If there is no cache hit, i.e., there is a cache miss, no data is written and operation in the cache terminates. Data is then accessed from the main memory (not shown).

If there is a hit, the bits taken from the byte within the word portion 239 of the address 236 is checked, then combined with the particular operation at hand, whether it be the "begin" copy case or the "end" copy case as described earlier, to determine which write enables 255 are sent to the various bytes 226, 228, 233, 236. In this manner, a portion of the word within the cache is written as a function of the address 236.

In the case of a cache miss, the data will be fetched from the main memory and put into the cache 220, and the entire operation described in the second preceding paragraph will be retried. At that point, a cache hit is assured and normal operation continues in the computer device.

We claim:

1. A computer device comprising:
   an instruction comprising:
   (a) a first field for identifying an operation of moving data from a register to a memory;
   (b) a second field for identifying an address register;
   (c) a third field for identifying a data register; and
   (d) a fourth field for specifying whether the contents of the address register should be modified;
   wherein the first, second, third, and fourth fields comprise one instruction that is executed within one instruction cycle of the computer device; and
   a means for modifying the address register in response to the fourth field of the instruction;
   a means for selecting a portion of the data register that will be moved into the memory wherein the means for selecting acts in response to the contents of the address register;
   a means for moving the selected portion of the data register into a memory location specified by the address register; and
   wherein the means for modifying, the means for selecting, and the means for copying are executed within one instruction cycle of the computer device.

2. The computer device as in claim 1, further comprising:
   a fifth field of the instruction wherein the fifth field specifies a displacement that the means for modifying the address register combines with the address register.

3. The computer device as in claim 2, further comprising:
   a means for selecting either the first byte or the last byte that will be moved into the memory wherein the means for selecting acts in response to a plurality of bits in the address register; and
   a sixth field of the instruction that classifies the byte selected as either a beginning byte or an end byte.

4. A computer device as in claim 1 wherein the means for selecting a portion of the data register further comprises:
   a means for selecting either the first byte or the last byte that will be moved into the memory wherein the means for selecting acts in response to a plurality of bits in the address register.

5. The computer device as in claim 4, further comprising:
   a sixth field of the instruction that classifies the byte selected as either a beginning byte or an end byte.

6. A method of moving bytes of a word into memory according to a single instruction comprising the steps of:
   locating the address register specified by the instruction;
   modifying the contents of the address register according to the instruction;
   locating the data register specified by the instruction;
   selecting a portion of the data register, in response to the address register, that will be moved into the memory;
   moving the selected portion of the data register into the memory; and
   wherein the steps of locating, modifying, locating, selecting, and moving are performed within a single instruction cycle of the computer.

7. The method of selecting a portion of the data register as in claim 6, further comprising the steps of:
   reading bits of the address register that point to a byte in the data register; and
   identifying the byte pointed to by the address register.

8. A method as in claim 7, wherein the step of moving is moving a portion of the data register preceding the byte pointed to by the address register.

9. The method of moving as in claim 8, wherein the step of moving includes moving the byte pointed to by the address register.

10. A method as in claim 7, wherein the step of moving is moving a portion of the data register following the byte pointed to by the address register.

11. The method of moving as in claim 10, wherein the step does not include moving the byte pointed by the address register.

* * * * *